US008238978B2

(12) United States Patent  
Taniguchi et al.

(10) Patent No.: US 8,238,978 B2  
(45) Date of Patent: Aug. 7, 2012

(54) PORTABLE APPARATUS

(75) Inventors: Hiroyuki Taniguchi, Tokyo (JP); Takashi Arai, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 387 days.

(21) Appl. No.: 12/465,687

(22) Filed: May 14, 2009

(65) Prior Publication Data

US 2009/0286575 A1 Nov. 19, 2009

(30) Foreign Application Priority Data

May 15, 2008 (JP) ................................ P2008-128199

(51) Int. Cl. *H04M 1/00* (2006.01)
(52) U.S. Cl. .................. 455/566; 455/575.1; 455/575.2; 455/575.3; 455/575.4; 455/575.8
(58) Field of Classification Search .......................... None
See application file for complete search history.

(56) References Cited

U.S. PATENT DOCUMENTS

| 2005/0059438 | A1* | 3/2005 | Jellicoe ........................ 455/575.1 |
| 2005/0104856 | A1* | 5/2005 | Jacobs et al. .................. 345/169 |
| 2005/0255897 | A1* | 11/2005 | Lee et al. ..................... 455/575.4 |
| 2005/0266897 | A1* | 12/2005 | Ahn et al. .................... 455/575.1 |
| 2006/0205438 | A1* | 9/2006 | Jung ............................. 455/566 |
| 2007/0041773 | A1* | 2/2007 | Pirila et al. .................... 400/680 |
| 2007/0099453 | A1* | 5/2007 | Park ............................... 439/103 |
| 2007/0249394 | A1* | 10/2007 | Bong Doo .................. 455/556.1 |
| 2007/0254730 | A1* | 11/2007 | Kim et al. ................... 455/575.4 |
| 2007/0279386 | A1* | 12/2007 | Lewis et al. ..................... 345/168 |
| 2008/0151510 | A1* | 6/2008 | Cho et al. ....................... 361/727 |
| 2008/0261666 | A1* | 10/2008 | Niitsu et al. .................. 455/575.4 |
| 2008/0297991 | A1* | 12/2008 | Ou ................................... 361/679 |
| 2009/0181733 | A1* | 7/2009 | Demuycnk ................. 455/575.3 |

FOREIGN PATENT DOCUMENTS

| CN | 2694645 | 4/2005 |
| CN | 101036100 | 9/2007 |
| CN | 101179916 | 5/2008 |
| JP | 2007-179525 | 7/2007 |

* cited by examiner

*Primary Examiner* — Dai A Phuong  
(74) *Attorney, Agent, or Firm* — Frommer Lawrence & Haug LLP; William S. Frommer; Thomas F. Presson

(57) ABSTRACT

A portable apparatus includes a first case portion including a full keyboard, a second case portion superposed on the first case portion, a slide connection member connecting the first case portion to the second case portion in such a manner that the first case portion is slidable in a direction perpendicular to a length direction of the full keyboard, and a display screen unit directly or indirectly disposed on a front surface of the second case portion, wherein the first and second case portions have a hiding mechanism with which a part of the slide connection member is prevented from being exposed to the outside when the first case portion is maximally slid out with respect to the second case portion.

7 Claims, 16 Drawing Sheets

FIG. 8A
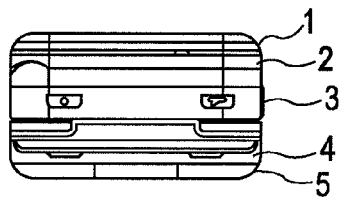
FIG. 8B  FIG. 8C  FIG. 8D  FIG. 8E
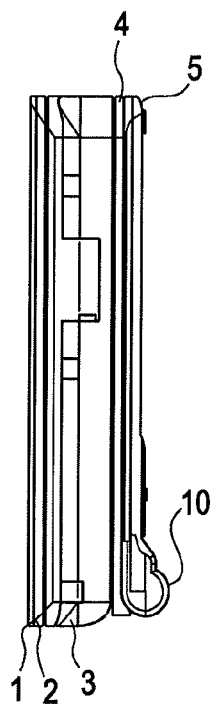 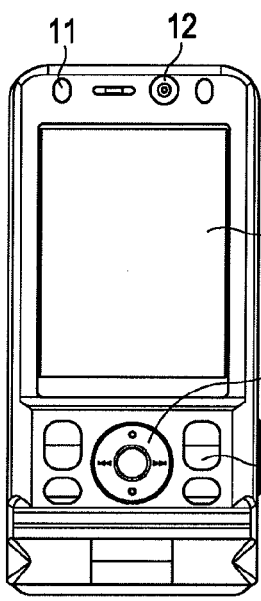 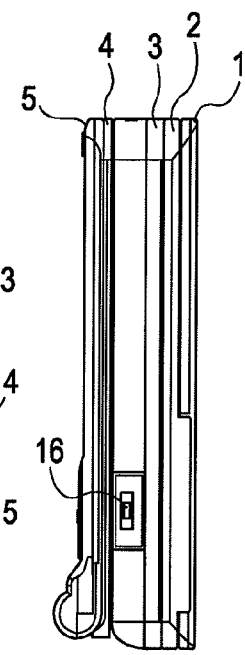 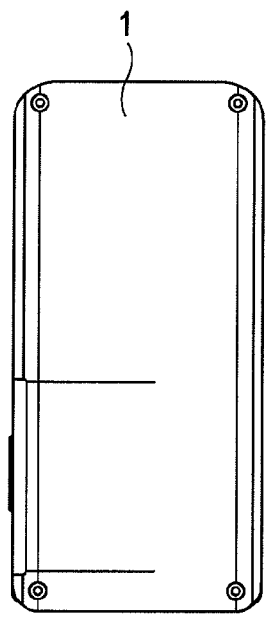
FIG. 8F
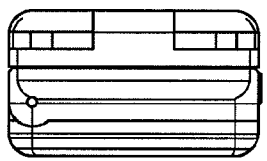

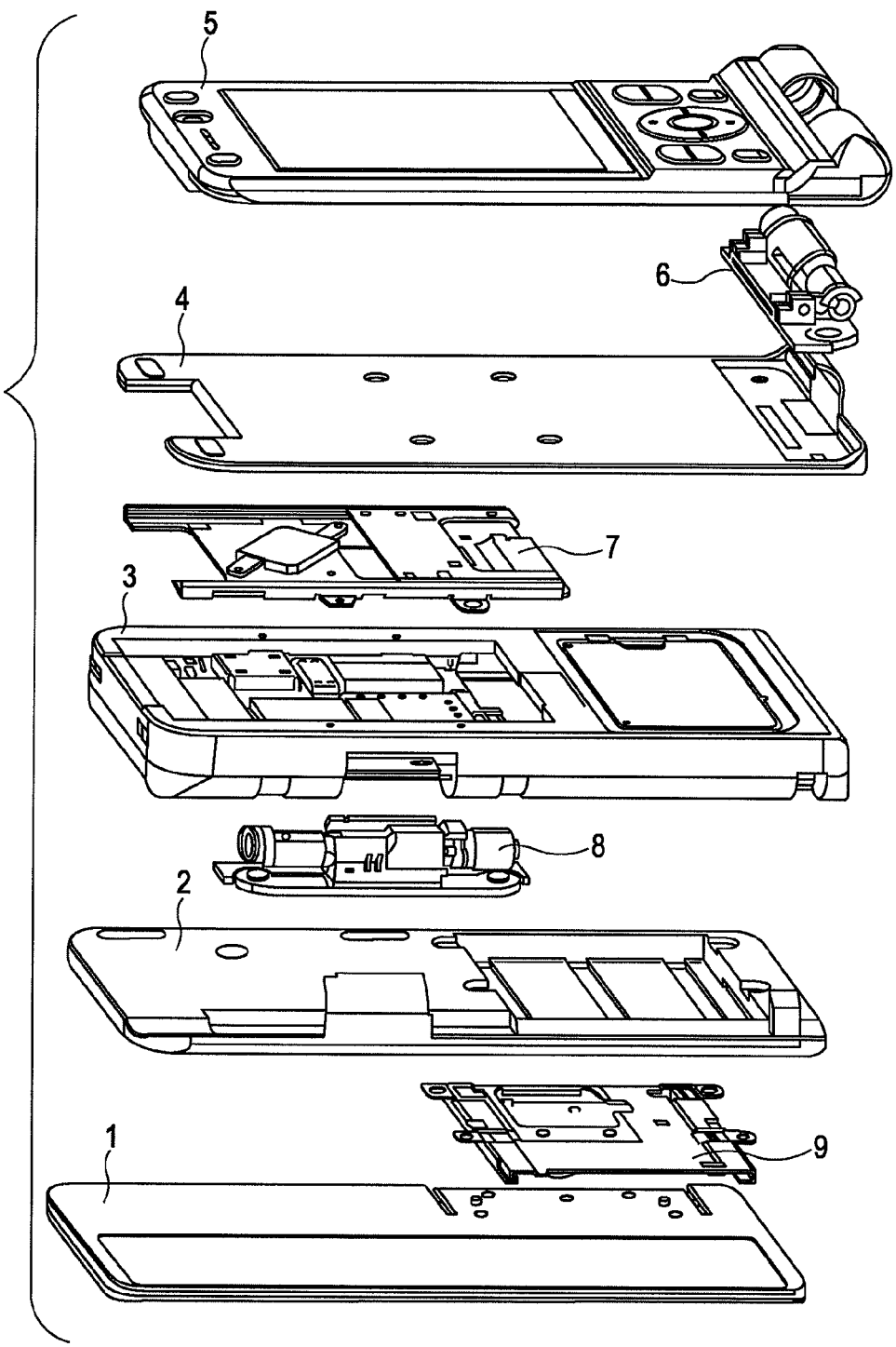

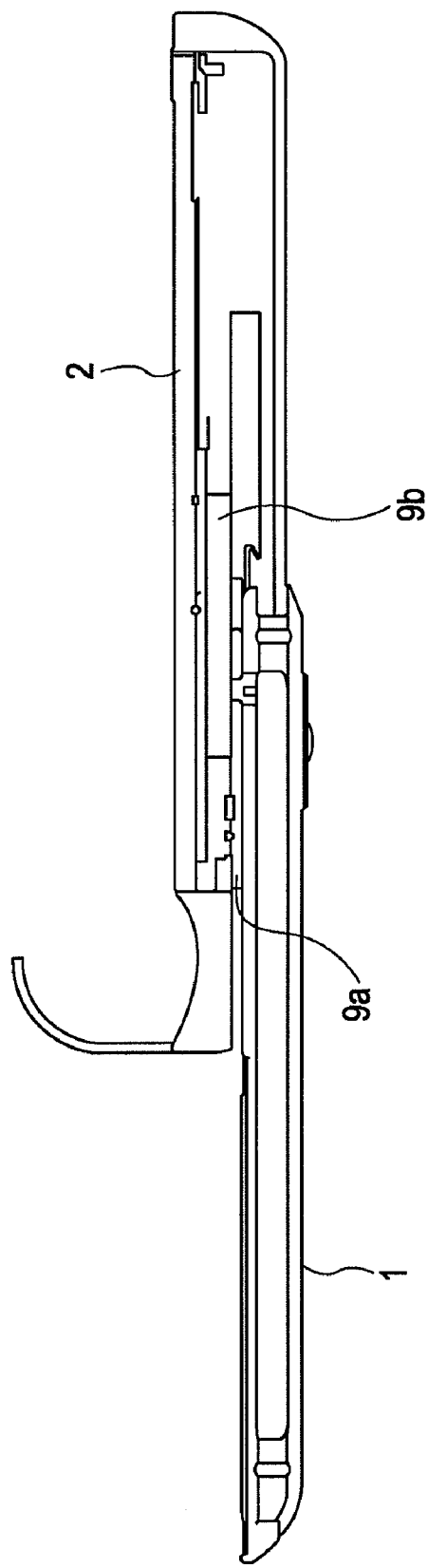
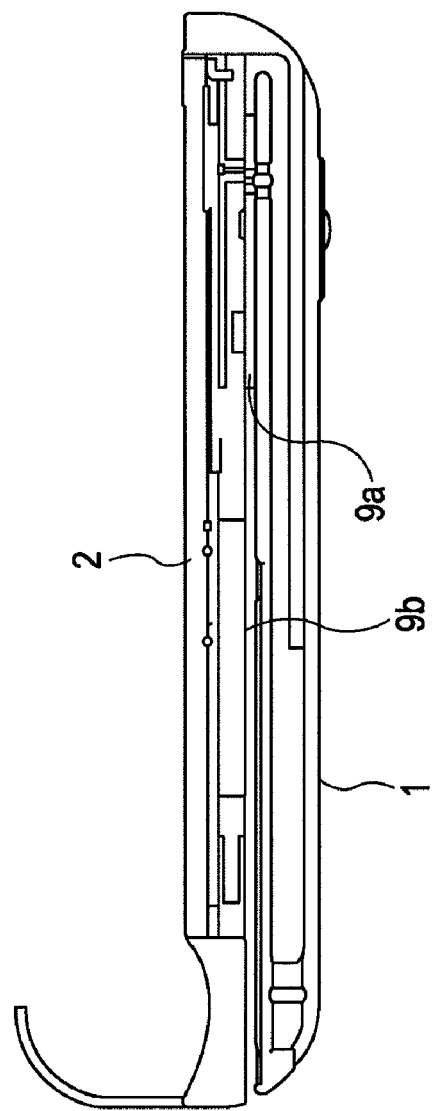

PORTABLE APPARATUS

BACKGROUND OF THE INVENTION

1. Field of the Invention

The present invention relates to a portable apparatus including a plurality of case portions that can be opened and closed by sliding and/or by rotation.

2. Description of the Related Art

Portable telephone apparatuses, which are typical portable apparatuses, have become multi-functionalized. As a result, new functions involving text inputting, such as chat, browsing, notepad, and schedule book functions, as well as traditional phone call and e-mail functions, have been made available. However, numeric keypads used in existing portable telephone apparatuses are thought to be unsuitable for inputting long sentences or inputting text messages in real-time for chatting or similar uses.

In recent years, slide-type portable telephone apparatuses that have upper and lower case portions and QWERTY keyboards instead of numeric keypads have appeared. In most cases, an apparatus with this structure adopts a configuration in which a QWERTY keyboard is normally hidden by a case portion having a display screen unit thereon and a user slides out and exposes the QWERTY keyboard so as to use the keyboard. With such a QWERTY keyboard, the user can hold the apparatus with both hands and press keys with his/her thumbs.

Japanese Unexamined Patent Application Publication No. 2007-179525 proposes a portable electronic apparatus having a three-tier case structure including a lower numeric-key case with a numeric keyboard, a middle full-keyboard case with a full keyboard, and an upper display unit case with a screen display unit. The lower numeric-key case can be slid and pulled out in the length direction of the upper, middle, and lower cases. The upper display unit case can be horizontally rotated on the middle full keyboard case with the center of a long side of the middle full keyboard case serving as an axis of rotation so that the full keyboard is exposed and the display unit becomes parallel to the full keyboard.

SUMMARY OF THE INVENTION

In a configuration allowing a full keyboard to be linearly slid out of the main case, when a long sliding distance has to be secured for the full keyboard in an apparatus having a relatively small case width, a part of an internal mechanism may be exposed to the outside when the full keyboard is pulled out.

The present invention provides a sufficient pull-out distance of a slide-type full keyboard in a portable apparatus while preventing a part of an internal mechanism from being exposed to the outside.

A portable apparatus according to an embodiment of the invention includes a first case portion including a full keyboard, a second case portion superposed on the first case portion, a slide connection member connecting the first case portion to the second case portion in such a manner that the first case portion is slidable in a direction perpendicular to a length direction of the full keyboard, and a display screen unit directly or indirectly disposed on a front surface of the second case portion, wherein the first and second case portions have a hiding mechanism with which a part of the slide connection member is prevented from being exposed to the outside when the first case portion is maximally slid out with respect to the second case portion.

With this structure, even when the full keyboard is maximally pulled out, the hiding mechanism functions so that a part of the slide connection member is not exposed to the outside. Therefore, a sufficient sliding distance is secured.

A portable apparatus according to another embodiment of the invention includes a first case portion including a full keyboard, a second case portion superposed on the first case portion, a slide connection member superposing the second case member on the first case member and connecting the first case portion to the second case portion in such a manner that the first case portion is slidable in a direction perpendicular to a length direction of the full keyboard, and a display screen unit directly or indirectly disposed on a front surface of the second case portion, wherein the second case portion has a lens unit of a camera on a rear surface thereof that faces the first case portion when the first case portion is closed and the first case portion serves as a lens cover of the camera, the lens cover capable of being opened/closed in a sliding manner.

With this structure, a sliding portion of the first case portion serves to pull out the full keyboard and to expose the lens of the camera.

A portable apparatus according to still another embodiment of the invention includes first to fifth case portions superposed on each other in a closed state, at least one slide connection member connecting adjacent case portions among the first to fifth case portions in such a manner that the adjacent case portions are slidable with respect to each other, and at least one rotatable connection member connecting adjacent case portions among the first to fifth case portions in such a manner that the adjacent case portions are rotatable with a short side or a long side thereof serving as an axis of rotation, wherein each of the slide connection member and the rotatable connection member performs an open/close operation of corresponding one of the case portions, and the portable apparatus can take at least six different configurations in accordance with combinations of the open/close operations.

With this structure, a suitable configuration can be used for each of various functions of the portable apparatus.

With the portable apparatus according to the embodiment of the invention, a user can place the apparatus on a desk or the like and the user can use the full keyboard with ten fingers of both hands in the same manner as using a PC. Moreover, because the hiding mechanism serves to prevent a part of the slide connection member from being exposed to the outside when the sliding portion is maximally slid out, a sufficient sliding distance can be secured.

With the portable apparatus according to the another embodiment of the invention, it is not necessary to prepare an independent lens cover, because the first case portion serves as a lens cover.

With the portable apparatus according to the still another embodiment of the invention, a configuration suitable for each of various functions of the portable apparatus can be selected, whereby operability and usability are improved.

BRIEF DESCRIPTION OF THE DRAWINGS

FIG. 8A is a top view, FIG. 8B is a left-side view, FIG. 8C is a front view, FIG. 8D is a right-side view, FIG. 8E is a rear view, and FIG. 8F is a bottom view of the portable telephone apparatus shown in FIG. 1 in a state in which all the case portions of the portable telephone apparatus are closed;

FIG. 9 is an exploded perspective view showing all the case portions of the portable telephone apparatus shown in FIG. 1 and connection members connecting the case portions with each other;

FIGS. 13A and 13B are sectional views of two of the case portions of the portable telephone apparatus shown in FIG. 1 in an open state and in a closed state taken in a length direction of the portable telephone apparatus;

DESCRIPTION OF THE PREFERRED EMBODIMENTS

Hereinafter, an embodiment of the present invention is described in detail with reference to the drawings.

A portable telephone apparatus according to the embodiment can be used like a notebook PC having a QWERTY keyboard as a so-called full keyboard. Moreover, the portable telephone apparatus can be changed into a configuration suitable for performing a function such as a phone call, an electronic mail (referred to as "e-mail" below), a camera, a game, a TV, a music, browsing, or a videophone function. Furthermore, the portable telephone apparatus is low-profile and all opening/closing mechanisms thereof are configured to be changed with one step from a closed state to almost any of the configurations so as to improve usability.

Figure 1:
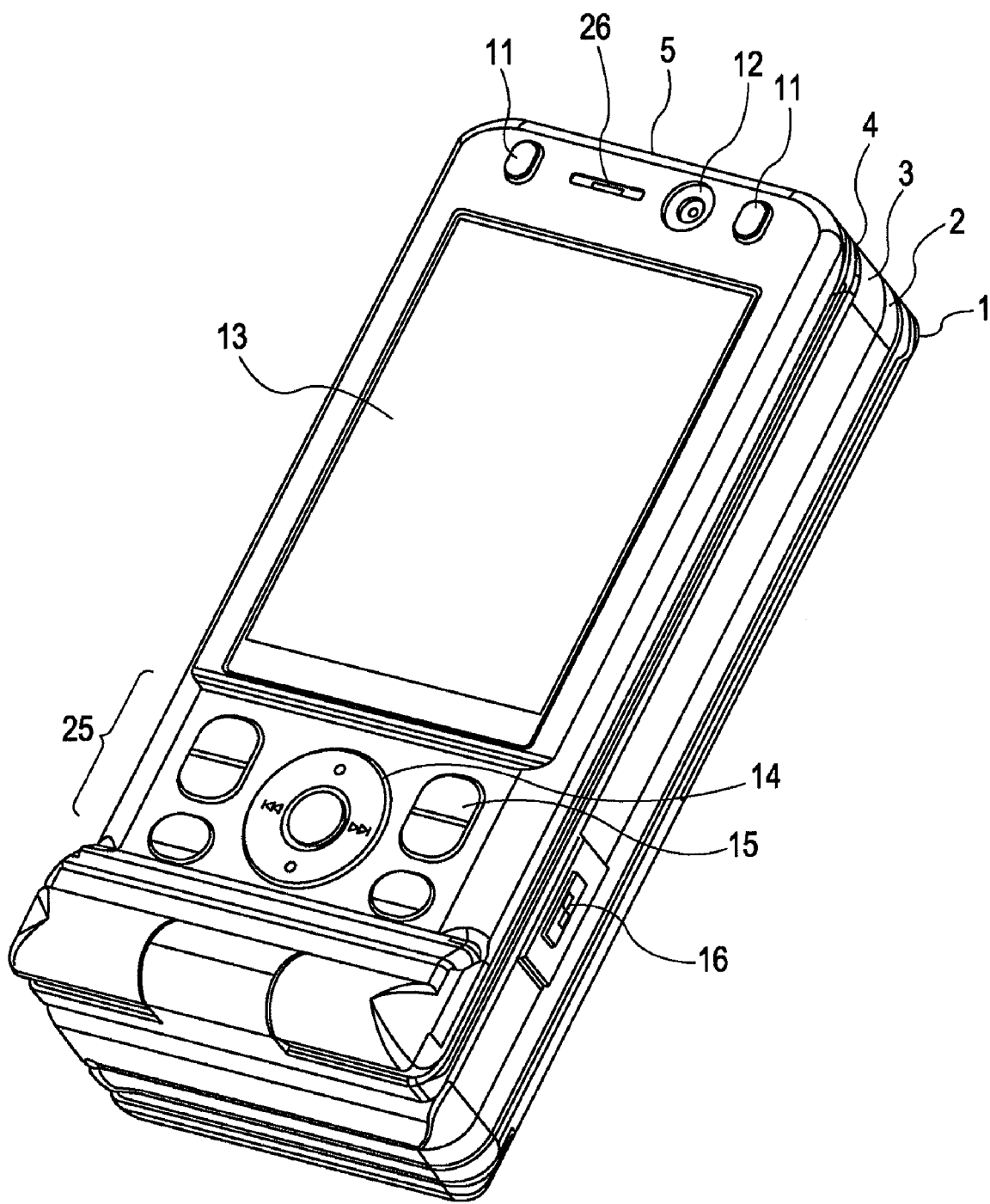
FIG. 1 is an external perspective view of a first configuration of a portable telephone apparatus according to an embodiment of the present invention.

FIG. 1 is an external perspective view showing the portable telephone apparatus in a first configuration in which all opening/closing mechanisms are in closed states.

The entire case of the portable telephone apparatus includes case portions 1 to 5 that are stacked. A display screen unit 13, an operation unit 25, and other components are disposed on the case portion 5. The first configuration, in which the display screen unit 13 is exposed to the front, is the same as the configuration of a typical slide-type portable telephone apparatus when its sliding portions are closed. The operation unit 25 is disposed on substantially the same plane as the display screen unit 13 and adjacent to the lower side of the display screen unit 13. The operation unit 25 includes a cross key 14 and various operation keys 15. A pair of gaming keys 11 are disposed above the display screen unit 13. A speaker 26 and a front camera 12 are disposed between the gaming keys 11. The first configuration is suitable for occasions when a user carries out a phone call, an e-mail, browsing, a game, or a music playback function while holding the case.

In a configuration for carrying out a phone call, a music playback, or a game function, the display screen unit 13 is commonly used. Besides the display screen, the cross key 14, the operation keys 15 for sending/receiving calls, and the gaming keys 11 are sufficient for the operations. Therefore, by disposing the keys on the front of the case, the portable telephone apparatus can be used in a configuration in which all the hinges are in closed states.

In particular, when a user plays a game with an existing portable telephone apparatus, the user usually operates the portable telephone apparatus with one hand while watching a portrait display. However, if the user can operate the portable telephone apparatus while holding the apparatus with both hands and watching a screen between both hands, the user can stably hold the portable telephone apparatus and easily play a game that demands a large number of buttons. For this reason, the gaming keys 11 are disposed on both ends in an upper part of the case portion 5. With this structure, a user can operate the gaming keys 11 with the right hand and operate the cross key 14 with the left hand while holding the apparatus in a landscape orientation with the display screen unit 13 between both hands.

When a user makes a phone call or plays music back, the display screen unit 13, the cross key 14 for selection and playback of music, and the operation keys 15 for sending/receiving phone calls are sufficient for this purpose.

Figure 2:
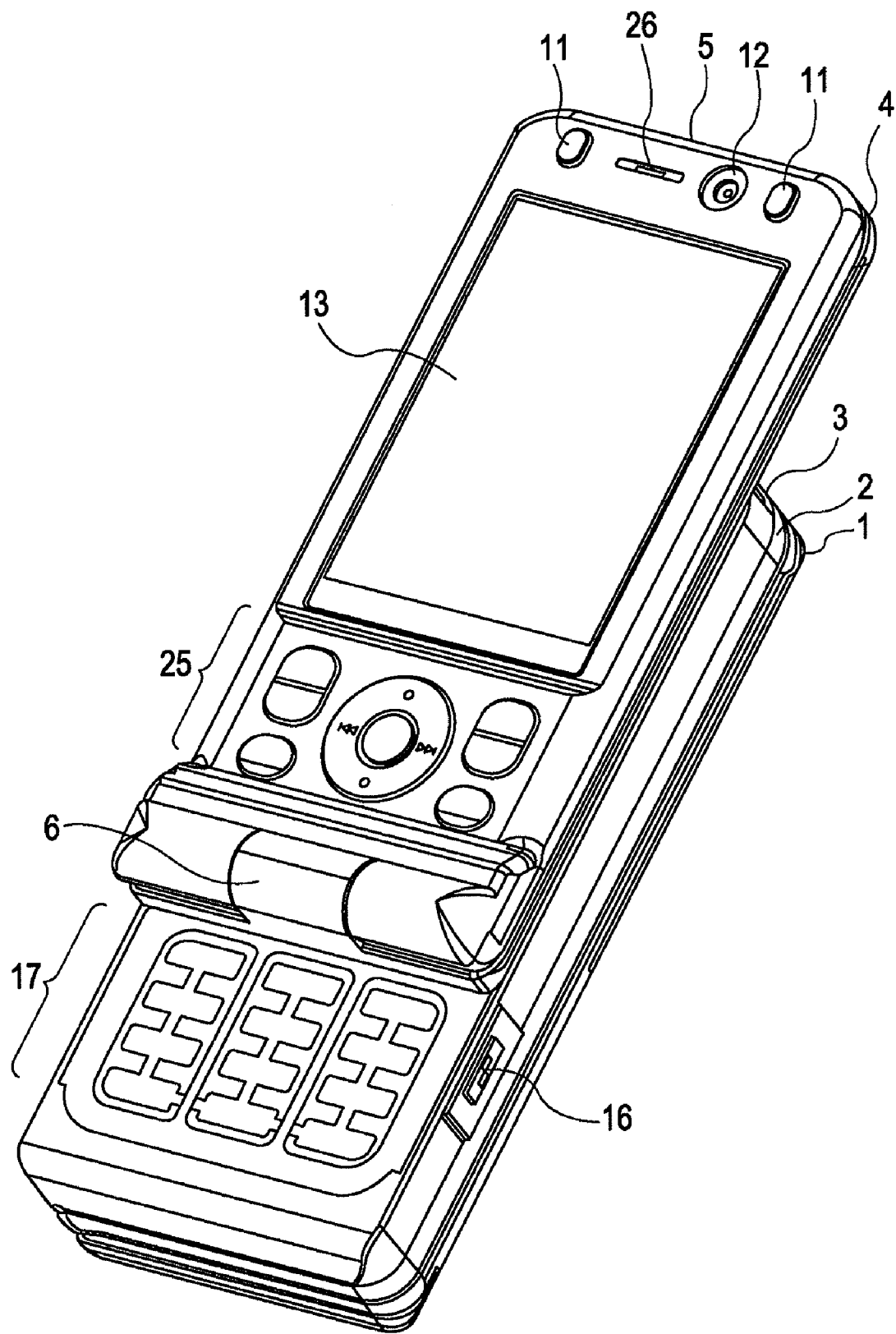
FIG. 2 is an external perspective view of a second configuration of the portable telephone apparatus shown in FIG. 1.

FIG. 2 shows a second configuration in which the portable telephone apparatus is in an open state. In the second configuration, the case portions 1 to 3 are slid out in the length direction with respect to the case portions 4 and 5. The second configuration is suitable for making a phone call using a numeric keyboard 17 or for writing an e-mail. That is, numbers for e-mail or phone call can be input on a portrait display when only the numeric keyboard 17 is exposed. The numeric keyboard 17 includes numeric keys, cursor-movement keys, a phone call key, a power key, and various other operation keys. A shutter button 16 of a camera, which is described below, is disposed in a lower part of a right side surface of the case portion 3. Usage of the camera is described below.

Figure 3:
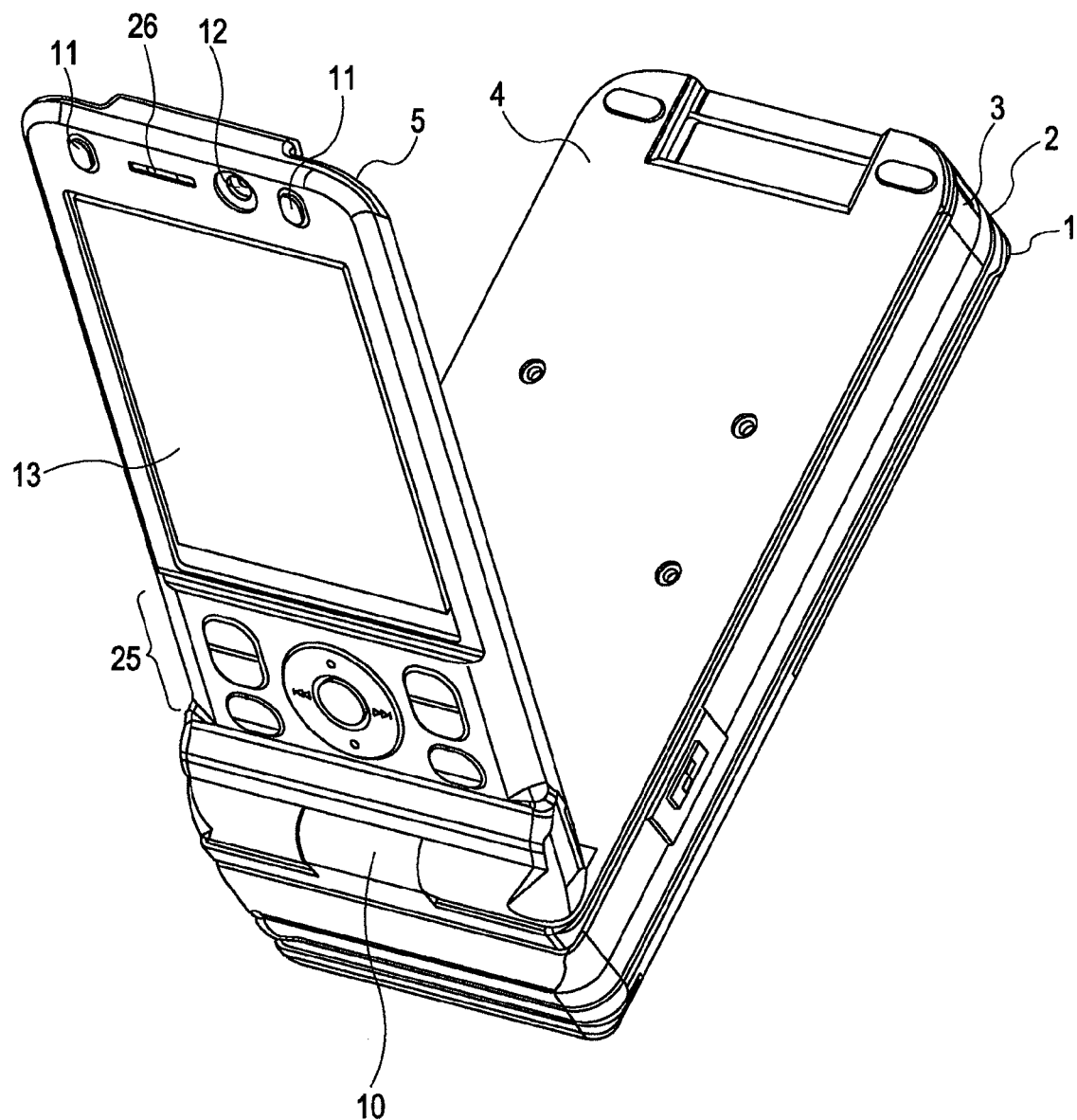
FIG. 3 is an external perspective view of a third configuration of the portable telephone apparatus shown in FIG. 1.

FIG. 3 shows a third configuration, which is suitable for watching TV and using a videophone function, with which a user can watch the display screen of the portable telephone apparatus placed on a desk or the like without holding the case with his/her hand. For this purpose, the portable telephone apparatus is in an open state in which the case portion 5 is inclined at a predetermined angle (for example, about 70°) with respect to the case portions 1 to 4, while the case portion 5 is supported by a one-axis hinge (disposed in a hinge protrusion 10) that connects the case portion 5 and the case portion 4 with each other on their short sides in such a manner that the case portions 4 and 5 are rotatable with respect to each other. That is, because the case portions 1 to 4 support the case portion 5 including the display screen unit 13 in such a manner that the case portion is rotatable, the apparatus can stand upright without being supported by a desk holder or the like. In this state, a user can watch the display screen unit 13 at an appropriate angle. Moreover, because the front camera 12 is disposed in the same plane as the display screen unit 13, a user watching a display screen while using a videophone function in the state shown in FIG. 3 is within the angle of the front camera 12.

Figure 4:
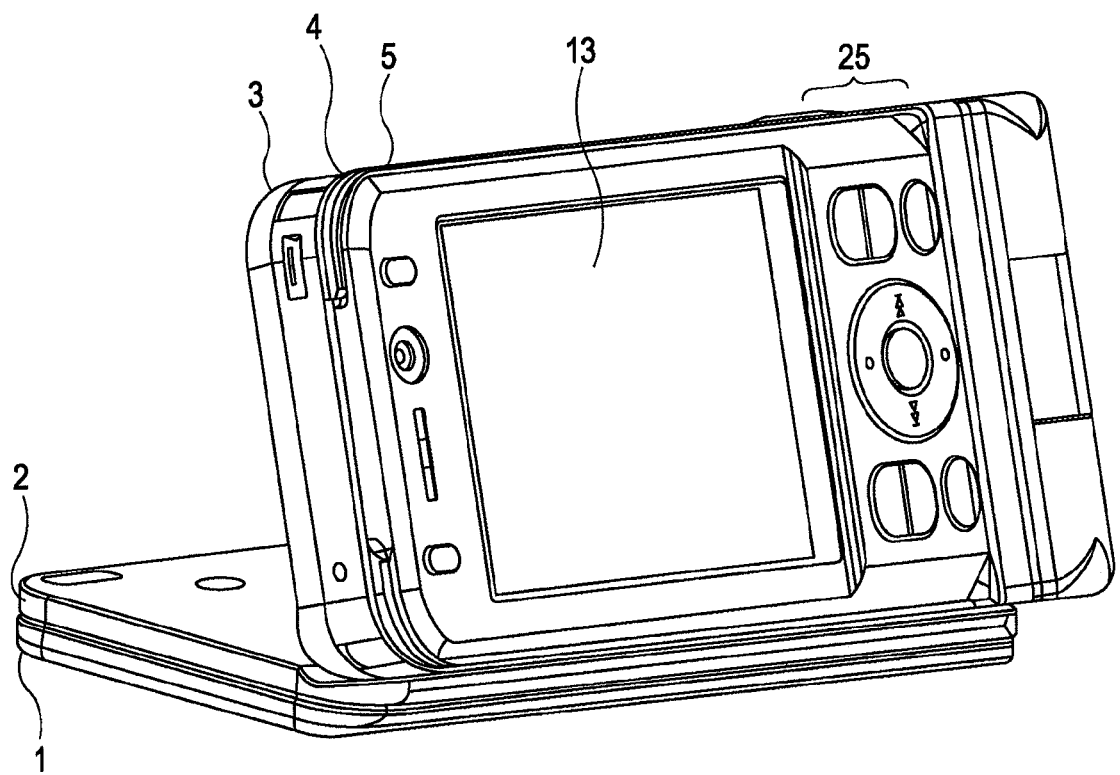
FIG. 4 is an external perspective view of a fourth configuration of the portable telephone apparatus shown in FIG. 1.

FIG. 4 shows a fourth configuration, which is suitable for watching TV, with which a user can watch the display screen of the portable telephone apparatus in a landscape orientation placed on a desk or the like without holding the case with his/her hand. The case portions 3 to 5 are connected to the case portions 1 and 2 with a rotatable connection member in such a manner that the case portions 3 to 5 are rotatable with a long side thereof serving as an axis of rotation. With this structure, the display screen unit 13 can be placed on a desk or the like in a landscape orientation at a predetermined angle.

Thus, a user can watch TV without holding the apparatus by placing the apparatus to be oriented horizontally with the display in a landscape orientation, and the user can talk using a videophone function without holding the apparatus with his/her hand by placing the apparatus to be oriented vertically with the display in a portrait orientation.

Figure 5:
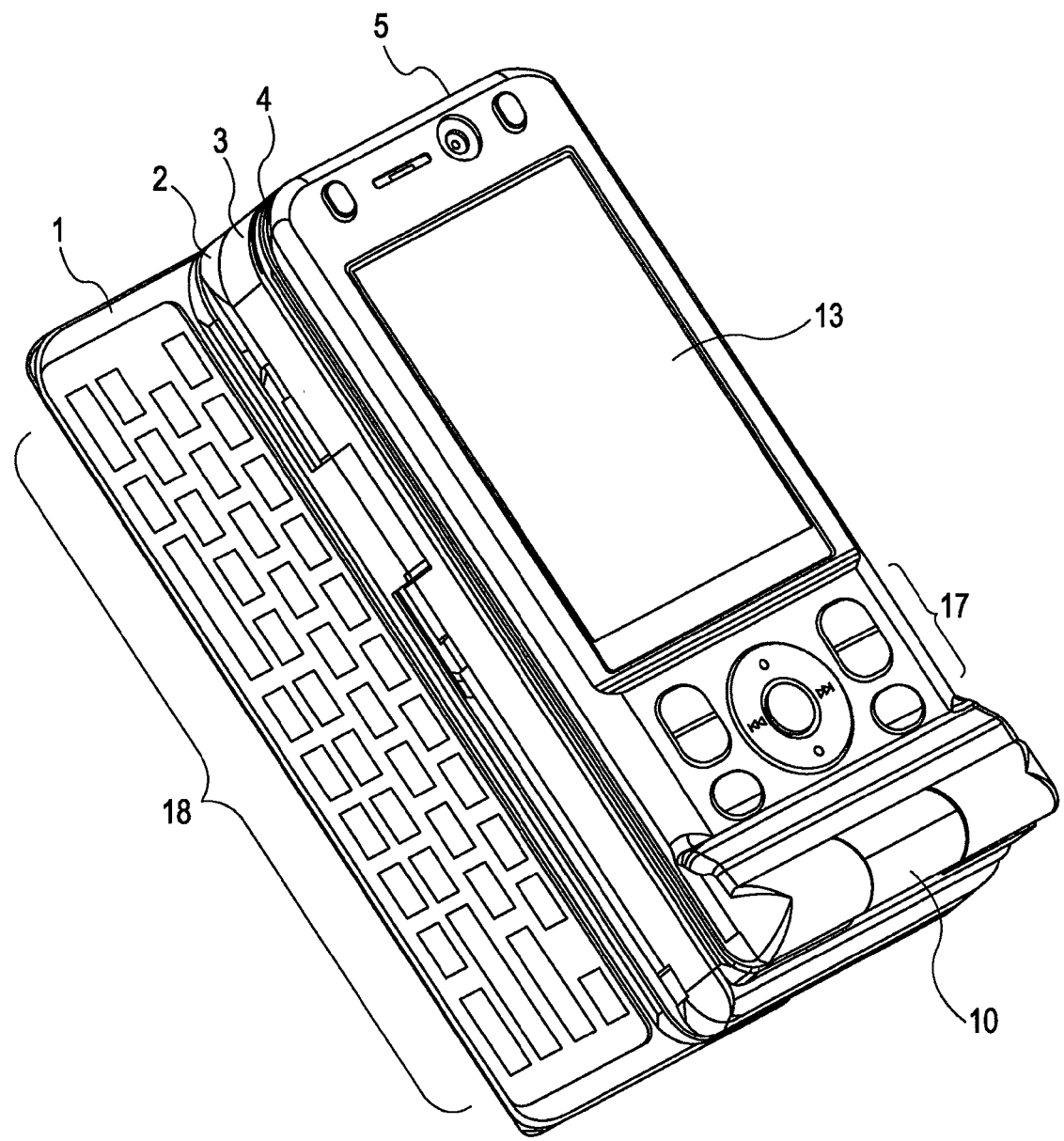
FIG. 5 is an external perspective view of a fifth configuration of the portable telephone apparatus shown in FIG. 1.

FIG. 5 shows a fifth configuration with which a user can input characters using a QWERTY keyboard 18 while the case is positioned on a desk or the like and without holding the case with his/her hand. For this purpose, the case portion 1 including the QWERTY keyboard 18 is made slidable with respect to the case portions 2 to 5 in the direction of a short side (the direction perpendicular to the length direction of the full keyboard). The term "QWERTY keyboard" refers to a so-called full keyboard including a set of alphanumeric character keys (also serving as Japanese kana keys) in a specific key arrangement. Due to size limitation, the QWERTY keyboard 18 does not include a dedicated numeric keypad. The full keyboard may have a key arrangement other than QWERTY.

Figure 6:
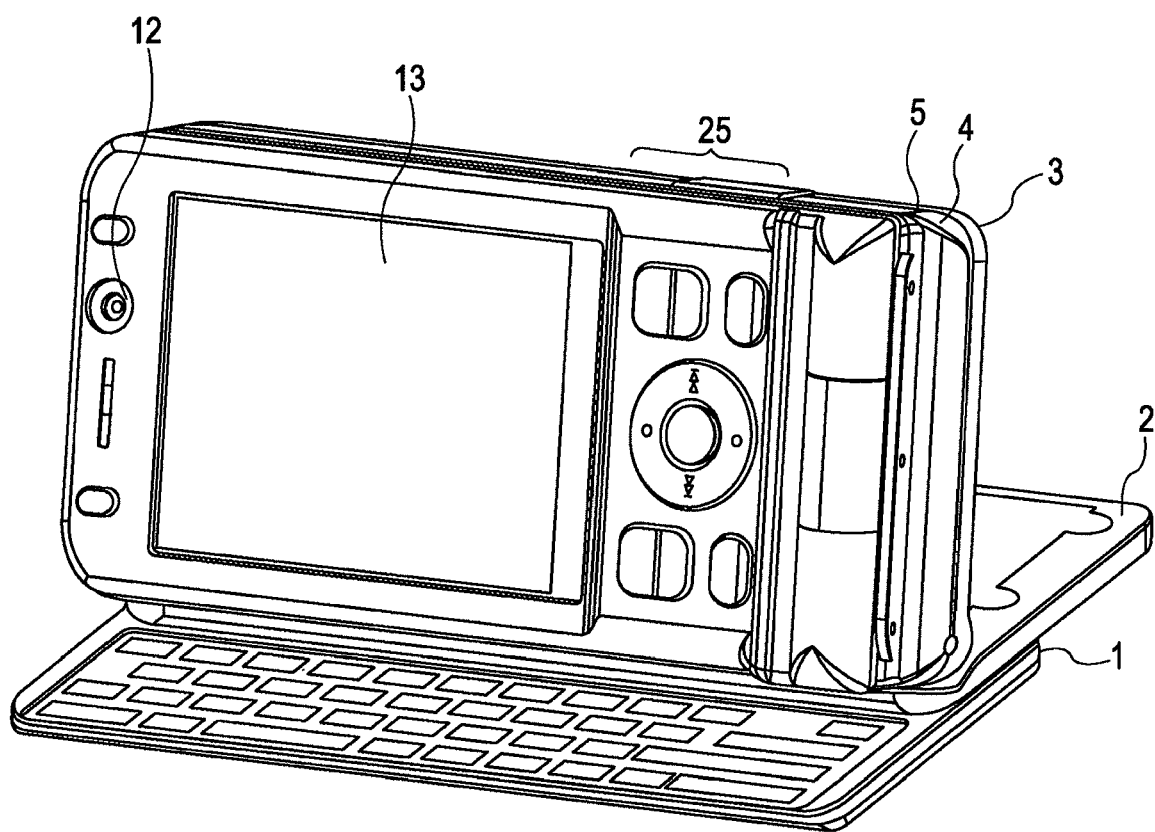
FIG. 6 is an external perspective view of a sixth configuration of the portable telephone apparatus shown in FIG. 1.

FIG. 6 shows a sixth configuration in which, compared with the fifth configuration shown in FIG. 5, the case portions 3 to 5 are open with respect to the case portion 2 at a predetermined angle as shown in FIG. 4. The sixth configuration is, in a sense, a configuration in which, compared with the fourth configuration shown in FIG. 4, the case portion 1 is slid out with respect to the case portion 2 so that the case portion 1 protrudes. Thus, with the sixth configuration, a user can change the orientation of the screen of the apparatus in accordance with the positions of the user's eyes and the direction of the user's gaze while the apparatus is positioned to be oriented horizontally. This is a mode in which the apparatus can be used in the same way as a so-called notebook PC, which is realized as a mode different from operation modes when the apparatus is being carried.

As described above, the portable telephone apparatus according to the embodiment can take any of the six configurations by making each hinge to be in an open state or not.

Figure 7:
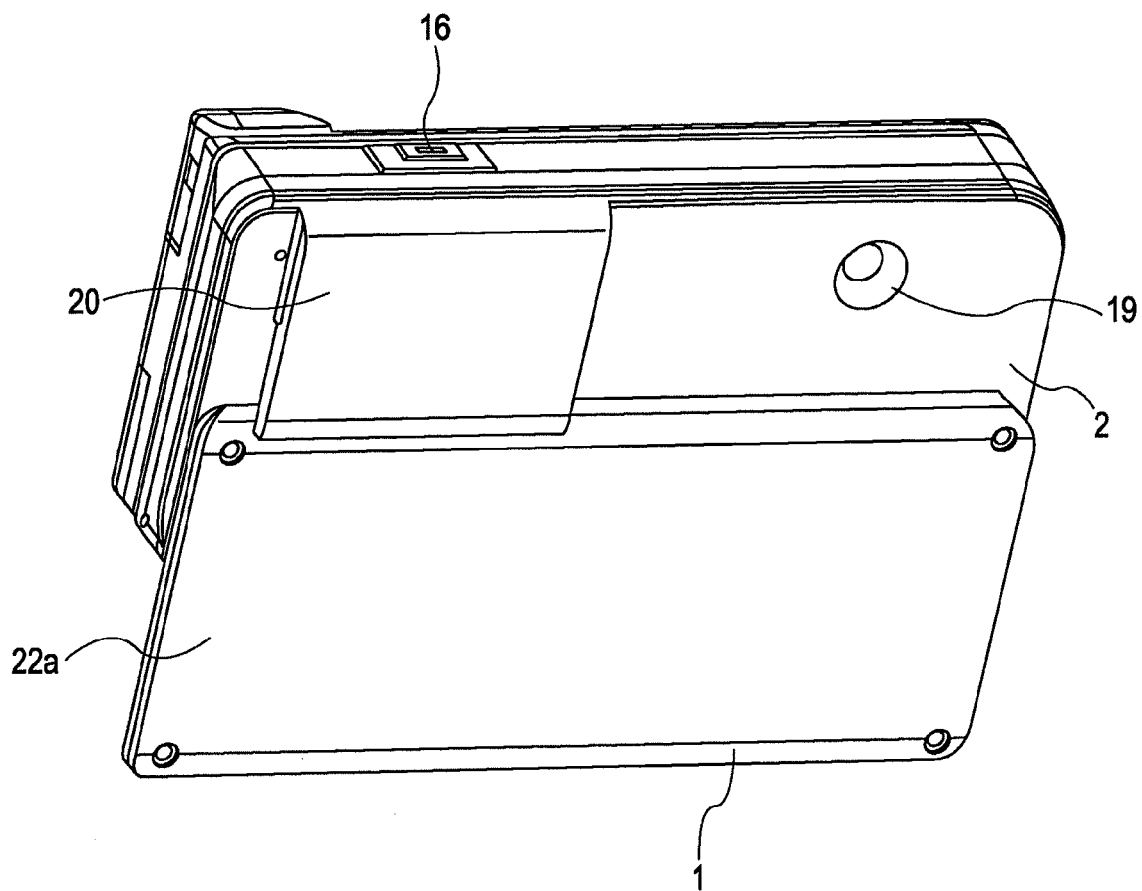
FIG. 7 is an external perspective view of a seventh configuration of the portable telephone apparatus shown in FIG. 1.

FIG. 7 shows a seventh configuration, which is the same as the fifth configuration, with which a user can use the apparatus in a landscape orientation as a camera. A lens unit of the camera 19 is disposed on a rear surface of the case portion 2. When the case portion 1 is slid out and protrudes forward, the lens unit is exposed to the outside. As with a typical existing digital camera, a user can take a picture by pressing the shutter button 16 with the index finger of his/her right hand while holding the case in a landscape orientation so that the lens faces an object. Thus, the user can take a picture while monitoring the object with the display screen unit.

As described above, a portable apparatus according to the embodiment of the invention includes the first to fifth case portions superposed on each other in a closed state, at least one slide connection member connecting adjacent case portions among the first to fifth case portions in such a manner that the adjacent case portions are slidable with respect to each other, and at least one rotatable connection member connecting adjacent case portions among the first to fifth case portions in such a manner that the adjacent case portions are rotatable with a short side or a long side thereof serving as an axis of rotation. Each of the slide connection member and the rotatable connection member performs an open/close operation of corresponding one of the case portions. The portable apparatus can take at least six different configurations in accordance with combinations of the open/close operations.

The structure, with which a configuration suitable for each of various functions can be taken, allows a user to change the apparatus with one action into a configuration suitable for using a phone call, an e-mail, a TV, a game, a music, a camera, or a videophone function basically by opening a hinge from a state in which all hinges (the slide connection members or the rotatable connection members) are closed. Thus, the apparatus can be readily changed into any one of the configurations and can be changed with one action into a configuration suitable for answering a phone when the apparatus receives a call.

It is not necessary for one function to correspond to one configuration. A function may be used with a plurality of configurations. For example, the TV watching function can be used with the first, third, or fifth configuration.

In order to provide all configurations suitable for functions, the structure of the entire apparatus may become complex. Therefore, the thickness of the portable telephone apparatus may increase and, as a result, portability and usability of the portable telephone apparatus may be impaired. In order to address the problem, a structure in which usability is taken into account by incorporating two ideas for realizing a low-profile was conceived.

First, instead of providing a different display screen unit for each function, a single display screen unit is commonly used in different configurations so as to prevent the apparatus from becoming thick. Moreover, each configuration is realized by disposing the display screen unit 13 in the uppermost case portion and by rotating and sliding other case portions around the display screen unit 13.

Second, when a plurality of hinges (one-axis hinge and slider) are disposed between the cases, the thickness of the hinges may affect the thickness of the apparatus. Therefore, the arrangements of the hinges are carefully considered. As shown in FIG. 2, a one-axis hinge 6, which can be rotated with a short side thereof in the width direction serving as an axis of rotation, is disposed in an uppermost tier in a protruding manner so that the apparatus is made small. Moreover, as shown in FIG. 9, the case portion 4 is treated as a part of a hinge, and the one-axis hinge 6 and a slider 7 are disposed on the case portion 4.

Regarding usability, as shown in FIG. 2, the numeric keyboard 17 is disposed not on a low-tier case portion but on the case portion 3 in a middle tier on the assumption that the cross key 14 and the numeric keyboard 17 of the operation unit 25 can be easily operated with one hand when the cross key 14 and the numeric keyboard 17 are close to each other in the thickness direction. Because a slider 9 that slides in the width direction is disposed between the case portion 1 in the lowermost tier and the case portion 2 in the uppermost tier, the QWERTY keyboard 18 can be exposed in an open state as shown in FIGS. 5 and 6.

As can be seen from FIG. 7, in the open state, the camera 19, which is mounted on the rear surface of the case portion 3, is also exposed. That is, when the slider 9 is in a closed state, the case portion 1 covers the camera, and the slider 9 serves as a lens cover that can be opened/closed in a sliding manner. Thus, a mode with two functions is realized by using only one hinge (the slider 9).

FIGS. 8A, 8B, 8C, 8D, 8E, and 8F are respectively a top view, a left-side view, a front view, a right-side view, a rear view, and a bottom view of the case in a state in which all the case portions 1 to 5 are closed.

FIG. 9 is an exploded perspective view of the case portions 1 to 5 and connection members connecting the case portions with each other. The connection members include the one-axis hinge 6, the slider 7, a one-axis hinge 8, and the slider 9.

The one-axis hinge 6, which serves as a rotatable connection member, connects the case portion 5 to the case portion 4 in such a manner that the case portions 5 and 4 are rotatable with respect to each other with a short side of the case portions serving as an axis of rotation. That is, the one-axis hinge 6 is disposed on a short side of a main planar portion of the case portion 4 and supports the case portion 5 in such a manner that the case portion 5 is rotatable with the short side thereof serving as an axis of rotation. The slider 7, which serves as a slide connection member, connects the case portion 4 to the case portion 3 in such a manner that the case portions 4 and 3 are slidable with respect to each other in a direction parallel to a length direction of the case portions. The one-axis hinge 8, which serves as a second rotatable connection member, connects the case portion 3 to the case portion 2 in such a manner that the case portions 3 and 2 are rotatable with respect to each other with a long side of the case portions serving as an axis of rotation. The slider 9, which serves as a second slide connection member, connects the case portion 2 to the case portion 1 in such a manner that the case portions 2 and 1 are slidable with respect to each other in the direction perpendicular to the length direction of the case portions.

Figure 10B:
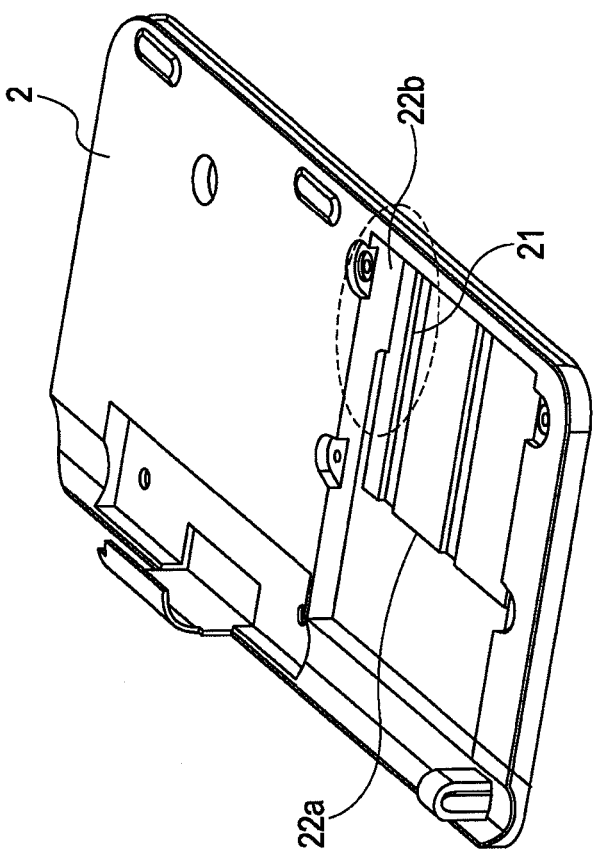
FIG. 10B is a perspective view.
Figure 10C:
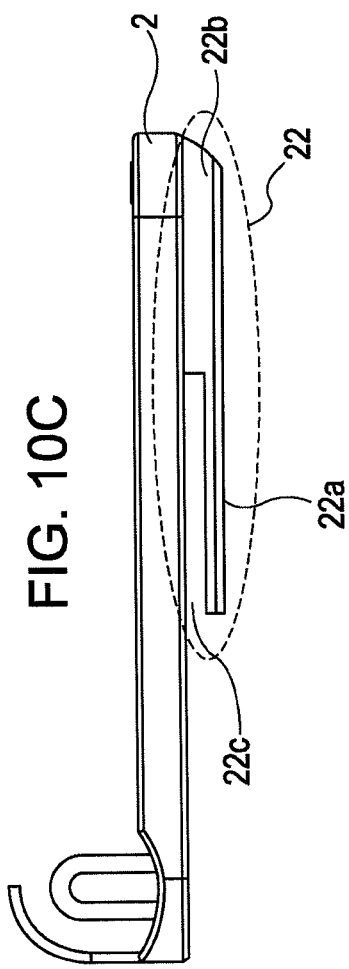
FIG. 10C is a side view of a case portion of the portable telephone apparatus shown in FIG. 1.
Figure 10A:
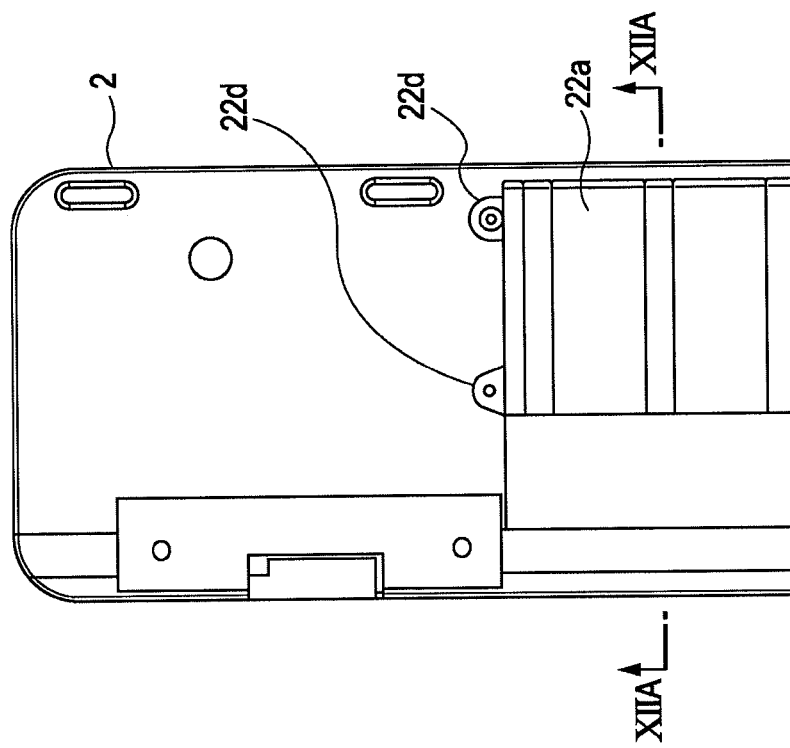
FIG. 10A is a plan view.

FIGS. 10A, 10B, and 10C are respectively a plan view, a perspective view, and a side view of the case portion 2. The case portion 2 includes a main planar portion and an extension portion 22a with a plate-like shape extending from a long side of the main planar portion substantially in parallel with the main planar portion.

Figure 11A:
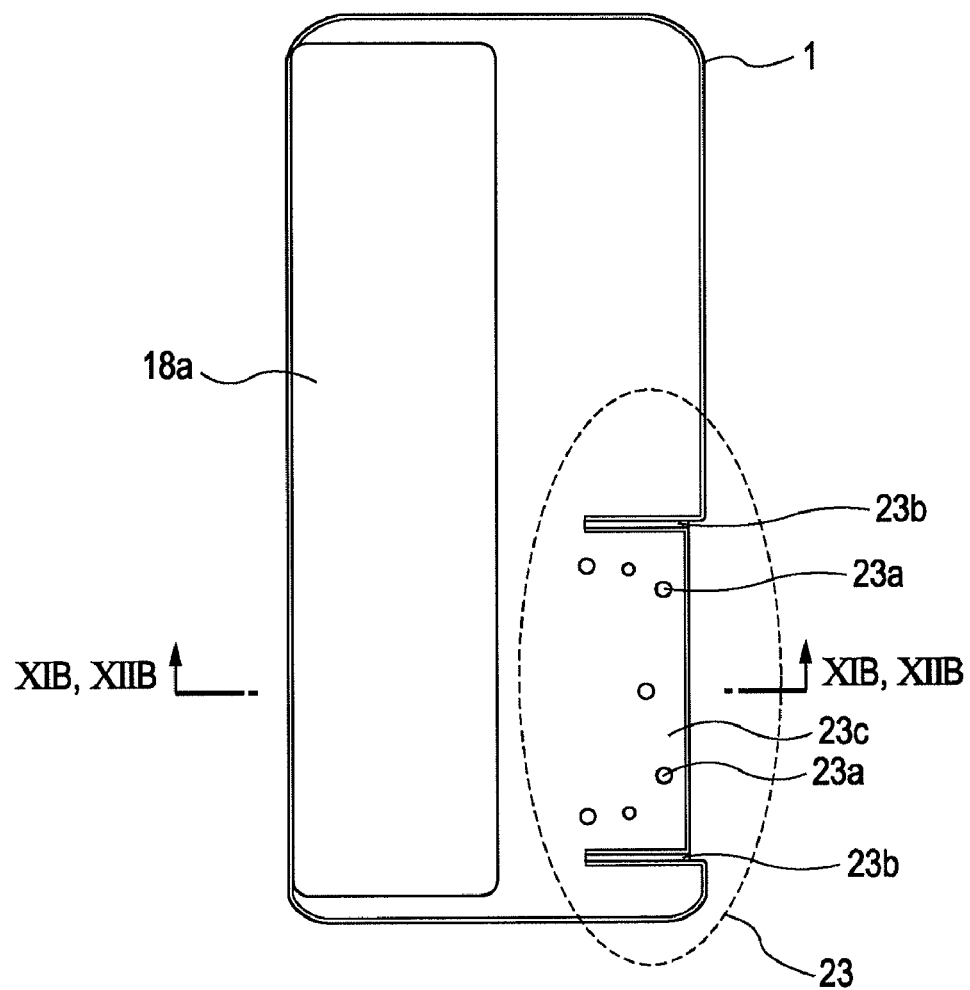
FIG. 11A is a plan view of a case portion of the portable telephone apparatus shown in FIG. 1.
Figure 11B:
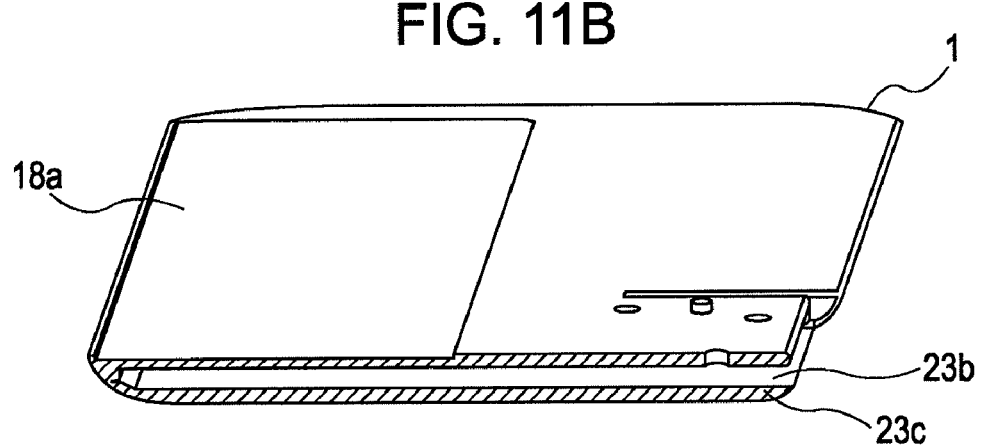
FIG. 11B is a sectional perspective view of the case portion taken along line XIB-XIB in FIG. 11A.

FIG. 11A is a plan view of the case portion 1, and FIG. 11B is a perspective sectional view of the case portion 1 taken along line XIB-XIB.

The apparatus according to the embodiment of the invention includes both sliders and one-axis hinges. Therefore, in order to secure portability, it is necessary that the apparatus have a layout and a structure with which the apparatus is prevented from becoming thick. If the hinges are disposed in a stacked manner, the thicknesses of the hinges affect the thickness of the apparatus. Therefore, in the embodiment, the case portion 2 is treated as a portion of a hinge, and both the one-axis hinge 8 and the slider 9 are disposed on the case portion 2 as shown in FIGS. 9 and 10. For this purpose, the one-axis hinge 8 and the slider 9 are not stacked in the thickness direction but are disposed parallel to each other and staggered relative to each other in a length direction. Thus, the apparatus is made low-profile.

Moreover, the embodiment of the invention is intended so that the QWERTY keyboard 18, which is moved in a sliding manner, can be exposed across a large area. For this purpose, it is necessary that the QWERTY keyboard 18 be slid by a long distance.

Figure 15A:
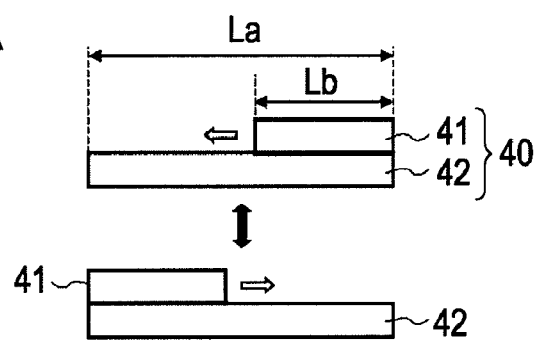
FIGS. 15A to 15C are views showing an outline structure of a general slider and a relation between the slider and case portions.

FIG. 15A shows an outline structure of a slider 40 that is generally used. The slider 40 includes a slide rail 42 (slide rail member) and a slide movement unit 41 (slide movement member). When the length of the slide rail is La and the length of the slide movement unit is Lb, a sliding distance is equal to La−Lb. As shown in FIG. 15C, when the length of slidable case portions (case portions 51 and 52) is L, it is necessary that La, Lb, and L satisfy expression (1) below so that a portion of the slider 40 is not exposed to the outside (not seen by a user) when the case portions slide.

$$L > La + (La - Lb) \quad (1)$$

However, it is difficult to secure a long sliding distance in the width direction, because the magnitude of L is limited since L is the width of the case.

Figure 15B:
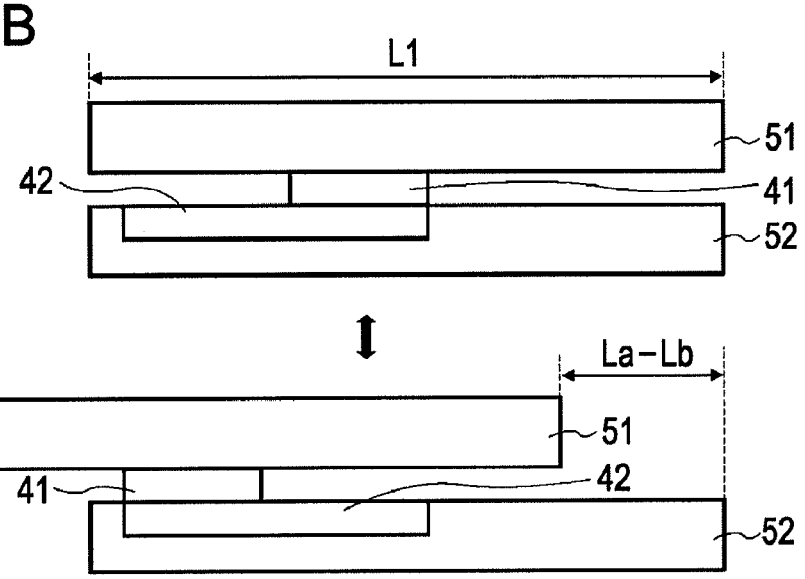
Figure 15C:
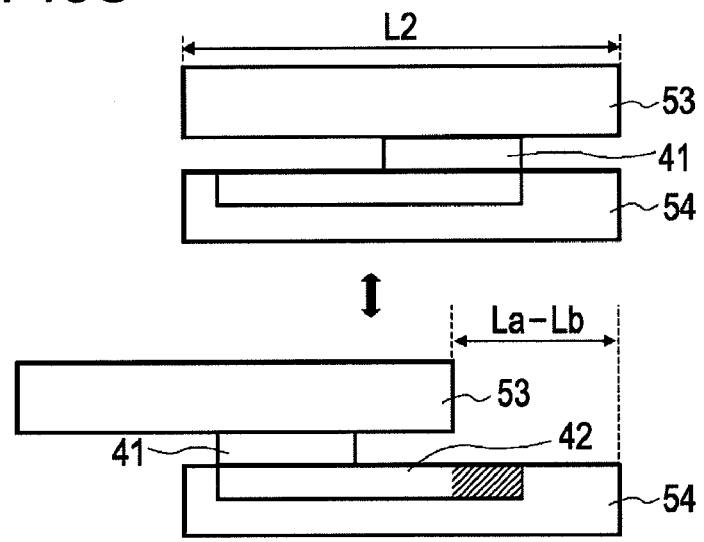

For example, if L=L1 as shown in FIG. 15B, the expression (1) holds. However, when the cases (case portions 53 and 54) have a length (width) L2 that is smaller than L1 as shown in FIG. 15C, expression (1) does not hold when the sliding distance La−Lb is the same as in the case with L1. Hence a portion (a hatched portion in FIG. 15C) of the slide rail 42 of the slider 40 is exposed to the outside from the case portion 53 side, when the case portion 53 is slid out and opened with respect to the case portion 54. On the other hand, the sliding distance may be limited so as to prevent the exposure.

The embodiment of the present invention employs a hinge hiding mechanism so as to provide a large sliding distance while hiding a hinge. The term "hinge hiding mechanism" refers to a mechanism with which a slide connection member (i.e., a slider) is prevented from being exposed to the outside even when the first case portion is maximally slid with respect to the second case portion. Note that a slider is also a type of hinge (slide hinge), and the term "hinge" in "hinge hiding mechanism" in the embodiment refers to a slider.

To be specific, first, La, which is a parameter that determines a sliding distance, is set to be as large as possible relative to L. Moreover, a slide rail 42 is disposed not on the case portion 1 on which the QWERTY keyboard 18 is disposed but on the case portion 2 so that the slide rail 42, which is the largest component of the slider, does not overlap an area 18a (keypad area) in which the QWERTY keyboard 18 is disposed (FIG. 11). In this case, when the case portion 1 is open with respect to the case portion 2, the slide rail is exposed to the outside. However, with the embodiment of the invention, the slide rail can be hidden with a hinge hiding mechanism described below.

The hinge hiding mechanism in the embodiment is designed not only for hiding a hinge but also for taking into account the thickness and strength of the apparatus.

First, regarding the shape, the case portion 2 has a first hinge hiding mechanism 22 as shown by a dotted line of FIG. 10C, and the first case portion 1 has a second hinge hiding mechanism 23 for receiving the first hinge hiding mechanism 22 as shown by a dotted line of FIG. 11A.

The first hinge hiding mechanism 22 includes the extension portion 22a, having a plate-like shape, which extends forward from a rear end (the right side of FIG. 10A) of a main part of the case portion 2 in a sliding direction and forms a space 22c. As can be seen in a region 21 shown by a dotted line in FIG. 10B, the strength of the first hinge hiding mechanism 22 serving as a component is reinforced by providing a rib 22b. The rib 22b constitutes a wall-like portion standing upright on a main planar portion of the case portion 2 on base portions on both sides of the extension portion 22a. Moreover, grooves 23b (FIG. 11A) are formed on a track of the rib 22b of the first hinge hiding mechanism 22 along which the hinge is opened/closed so that a backlash and an interference are prevented.

The first hinge hiding mechanism 22 of the case portion 2 has screw holes 22d to which slide rails of the slider 9 are screwed. The second hinge hiding mechanism 23 of the case portion 1 has a movement mount portion 23c with screw holes 23a to which slide movement units of the slider 9 is screwed.

After the apparatus has been assembled, the movement mount portion 23c is covered with the bottom of the case portion 1 and not visible from the outside.

Figure 12A:
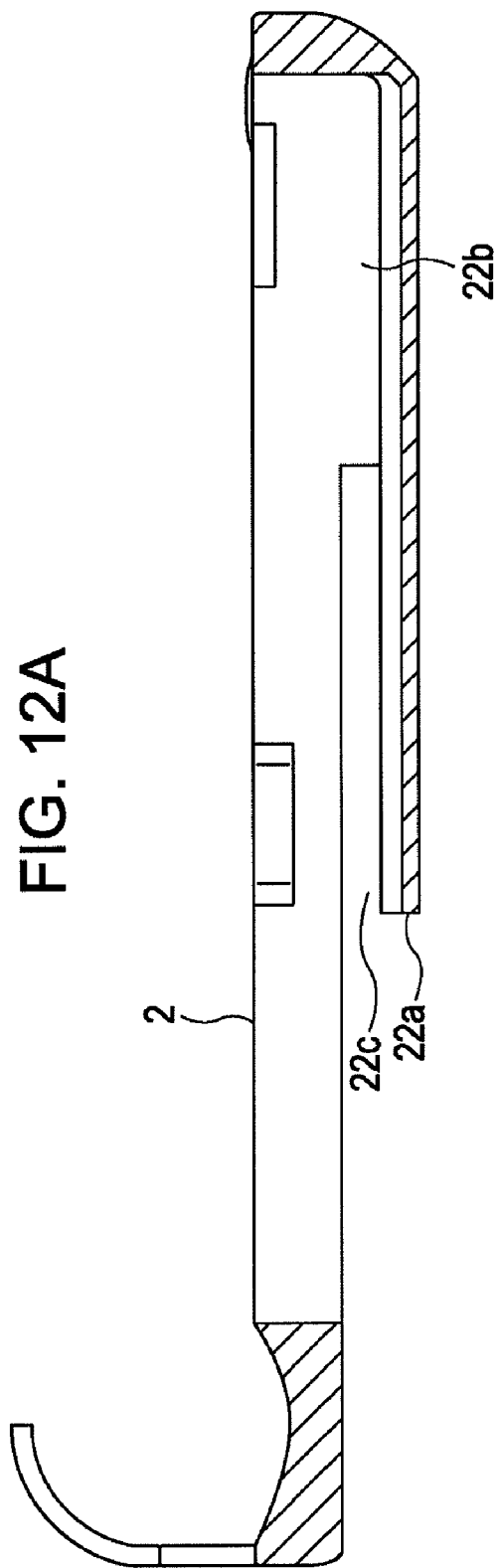
FIG. 12A is a sectional view of the case portion shown in FIG. 10B taken along line XIIA-XIIA.
Figure 12B:
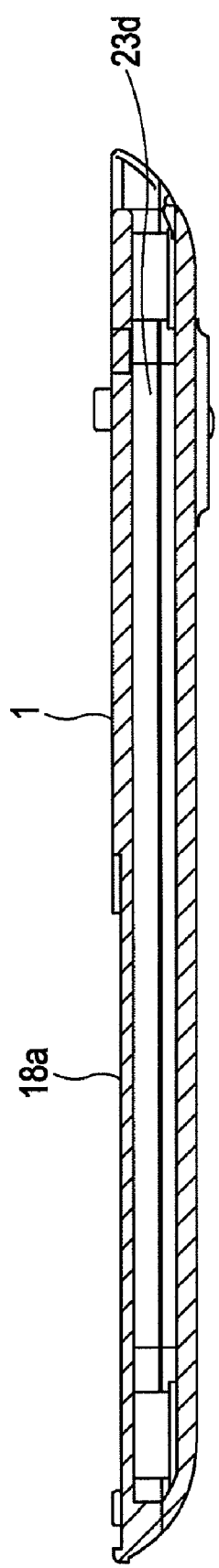
FIG. 12B is a sectional view of the case portion taken along line XIIB-XIIB in FIG. 11A.

FIG. 12A is a sectional view of the case portion 2 taken along line XIIA-XIIA of FIG. 10B. FIG. 12B is a sectional view of the case portion 1 taken along line XIIB-XIIB of FIG. 11A. Both sections have U-shapes. The case portion 1 (first case portion) has an open side portion on a long side thereof adjacent to a long side of the case portion 2 (second case portion), and the open side portion is connected to a space 23d in the case portion 1. When the case portion 1 is slid so as to be superposed on the case portion 2, the extension portion of the case portion 2 moves into the space 23d of the case portion 1. When the case portion 1 is maximally slid out of the case portion 2, an edge of the extension portion 22a remains within the space 23d because the extension portion 22a has a sufficient length. In other words, when the QWERTY keyboard 18 is closed with the slider 9, the movement mount portion 23c (FIG. 11A) moves into the space 22c of the first hinge hiding mechanism 22, and the extension portion 22a of the case portion 2 moves into the space 23d of the case portion 1.

When the slide hinge is closed, the first hinge hiding mechanism 22 of the case portion 2 is received by the second hinge hiding mechanism 23 of the case portion 1. When the slide hinge is open, the first hinge hiding mechanism 22 appears from the case portion 1, but the slide hinge is not visible to a user because the slide hinge is hidden by the extension portion 22a.

By providing the first hinge hiding mechanism 22, the thickness of the case portion 2 is increased. However, when the case portion 2 is joined with the case portion 1, the first hinge hiding mechanism 22 is received by the case portion 1, and the thickness as a set is not increased.

FIGS. 13A and 13B are sectional views of the case portion 1 and the case portion 2 in an open state and in a closed state along a section taken in a length direction. A slide rail 9b of the slider 9 is fixed to an inner side surface of the case portion 2. A slide movement unit 9a of the slider 9 is fixed on an upper surface of the case portion 1.

Figure 14A:
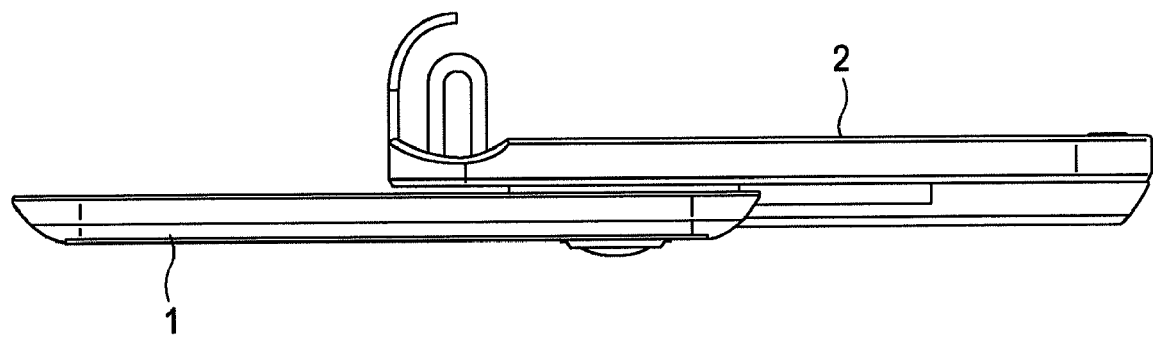
FIG. 14A a side view of and FIG. 14B is a rear perspective view of two of the case portions of the portable telephone apparatus shown in FIG. 1 in the open state.
Figure 14B:
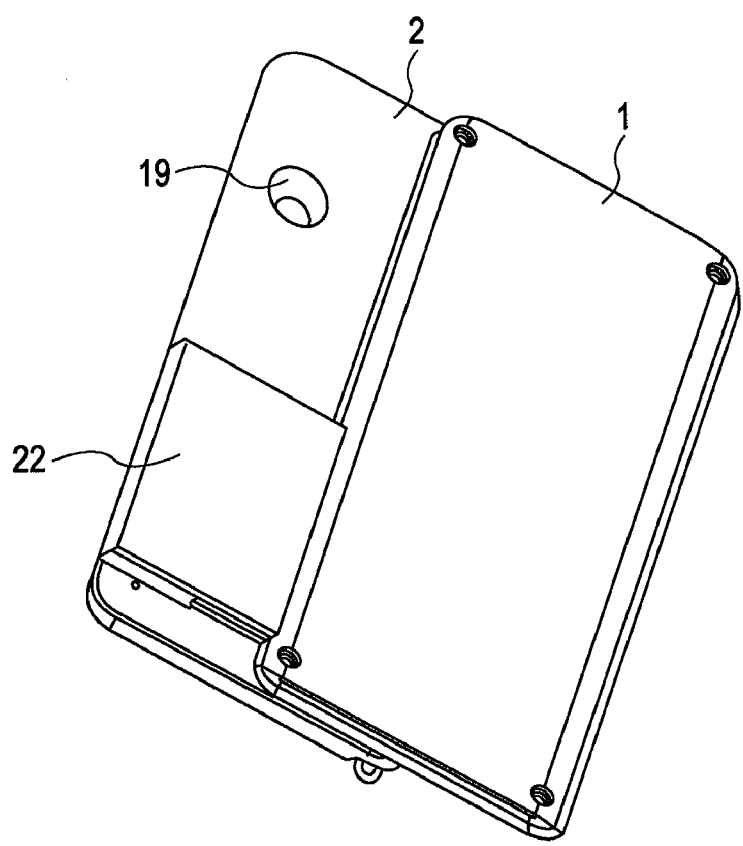

FIG. 14A is a side view of and FIG. 14B is a rear perspective view of the case portion 1 and the case portion 2 in an open state. It can be seen that, as described above, when the case portion 2 is pulled out of the case portion 1 with the slider 9, the camera 19 and the extension portion 22a of the first hinge hiding mechanism 22 are exposed.

With the above-described structure of the hinge hiding mechanism, the QWERTY keyboard 18 can be exposed across a large area while allowing the QWERTY keyboard 18 to be opened/closed and preventing the slider, which is an internal mechanism, from being seen by a user. As a result, the configurations shown in FIG. 5, FIG. 6, and FIG. 7 are realized.

Heretofore, a mechanism for securing a long sliding distance in a width direction of an apparatus is described. Because the mechanism does not depend on the parameters (L, La, and Lb) that determine the sliding distance, the mechanism has flexibility in that the mechanism is also applicable to a slide hinge in a longitudinal direction.

Moreover, in a portable telephone apparatus including a one-axis hinge and a slider, the same method for making the apparatus low-profile as described above can be used.

Functions of existing cameras include a technology with which a camera function is switched on or off when a lens cover is opened or closed. The technology is useful because a user does not have to give particular instructions in order to switch on or off the camera function because such instructions are linked with the movement of the lens cover. With the apparatus according to the embodiment, because the case portion 1 with the QWERTY keyboard 18 also serves as the lens cover, it is not possible to determine whether a user wants to use the QWERTY keyboard 18 or the user wants to use the camera 19 only from the fact that the user has pulled out the case portion 1. However, a user usually inputs characters with the QWERTY keyboard 18 when the case portion 1 (and the entire apparatus) is oriented substantially horizontally, while the user takes a picture with the camera when the case portion 1 is oriented substantially vertically. Therefore, by detecting the difference in the orientation of the apparatus, the function that the user wants to use can be estimated.

Figure 16:
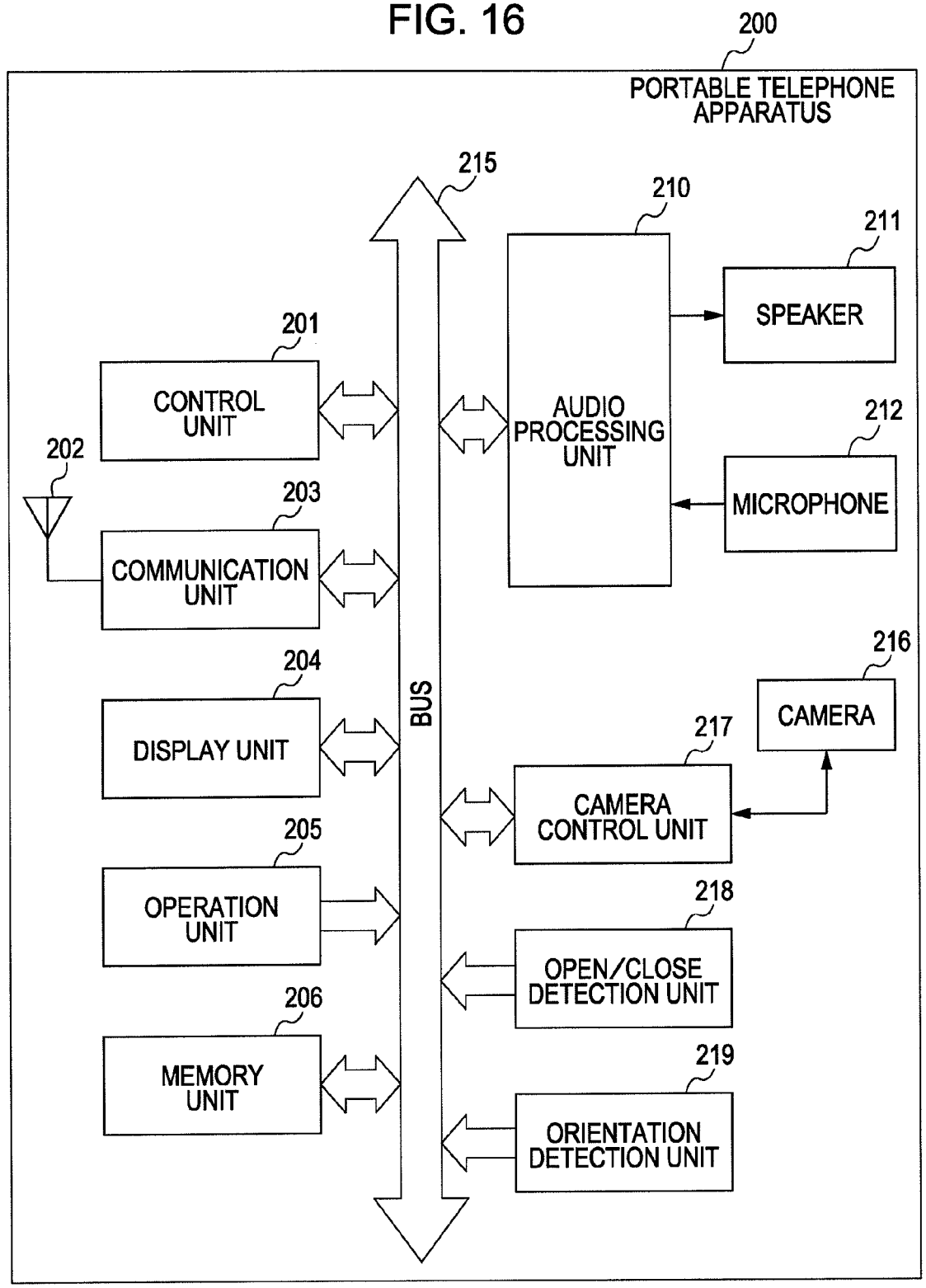
FIG. 16 is a block diagram showing an outline structure of a portable telephone apparatus according to an embodiment of the present invention.

FIG. 16 is a block diagram showing an outline structure of a portable telephone apparatus 200 in which such an estimation is performed.

The portable telephone apparatus 200 includes a control unit 201, a communication unit 203, a display unit 204, an operation unit 205, a memory unit 206, an audio processing unit 210, a speaker 211 connected to the audio processing unit 210, a microphone 212, a camera 216, a camera control unit 217, an open/close detection unit 218, an orientation detection unit 219, and a bus 215 connecting all of these components with each other.

The control unit 201 includes a CPU and controls the units of the portable telephone apparatus 200.

The communication unit 203 includes an RF unit and a modulation circuit. The communication unit 203 performs wireless communication with a base station through the antenna 202 in order to exchange a phone call, an e-mail, WEB data, etc.

The display unit 204 includes a display device such as an LCD or an organic electroluminescence display. The display unit 204 provides a display interface with which visual information is presented to the user.

The operation unit 205 includes the numeric keyboard 17 and the QWERTY keyboard 18. The operation unit 205 provides an input interface with which a user can input instructions and data.

The memory unit 206 includes storage devices such as a ROM, a RAM, and a HDD. The memory unit 206 stores programs including an OS and various applications executed by the CPU and various data. The ROM may include a rewritable nonvolatile memory such as a flash memory.

The audio processing unit 210 includes an audio encoder, a decoder, a DA converter, and an AD converter. The audio processing unit 210 outputs audio signals to the speaker 211 (including an earphone) and inputs audio signals from the microphone.

The camera 216, which corresponds to the above-described cameras 12 and 19, includes an image pickup device such as a CMOS or a CCD. The camera 216 is included in an image-taking unit for capturing digital image data of an object.

The open/close detection unit 218 is a sensor at least for detecting a slide open/close movement of the case portion 1 with respect to the case portion 2 with the slider 9. Open/close movements of other case portions using other sliders or one-axis hinges may be detected. Specific methods for the detection are not limited. For example, a mechanical switch or an optical sensor can be used.

The orientation detection unit 219 is a sensor at least for detecting the orientation of the case portion 1. Specific methods for the detection are not limited. For example, any existing sensors using gravitation can be used.

The control unit 201 determines whether to switch on the camera 19 from detection results by the open/close detection unit 218 and the orientation detection unit 219. That is, when it is detected that the case portion 1 is open and the QWERTY keyboard 18 is not oriented horizontally, the camera 19 is switched on.

The communication unit 203 and the audio processing unit 210 are not directly necessary for an embodiment of the invention.

A user may take a picture with the camera 19 when the lens is pointed substantially vertically downward. In this case, it is preferable to provide a method by which the user can change operations from inputting with a keyboard to image-taking with a camera with the assistance of the orientation detection unit 219. For example, this method can be realized by an operation with a specific key or by an operation with a combination of keys or by selection of a specific menu, or the like.

Various modifications and changes can be made to the above-described embodiments of the invention.

For example, the portable apparatus according to the embodiment of the invention basically includes a case portion 1 serving as a first case portion, a case portion 2 serving as a second case portion, a slider 9 connecting the case portions, and a display screen unit directly or indirectly disposed on a front surface of the second case portion. In addition to the combination of the case portion 1 and the case portion 2, a case portion 3 may be connected to the case portion 2 with a one-axis hinge 8. In this case, a display screen unit may be disposed directly or indirectly disposed on the front surface of the case portion 3 serving as a third case portion. Moreover, in addition to the combination of the case portions 1 to 3, a case portion 4 may connected to the case portion 3 with a slider 7. In this case, the display screen unit may be disposed directly or indirectly on a front surface of the case portion 4 serving as a fourth case portion. Furthermore, in addition to the combination of the case portions 1 to 4, a case portion 5 may be connected to the case portion 4 with a one-axis hinge 6. In this case, as shown in the above-described embodiments, the display screen unit is directly disposed on the front surface of the case portion 5 serving as a fifth case portion.

The present application contains subject matter related to that disclosed in Japanese Priority Patent Application JP 2008-128199 filed in the Japan Patent Office on May 15, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A portable apparatus comprising:
a first case portion including a full keyboard;
a second case portion superposed on the first case portion;
a slide connection member connecting the first case portion to the second case portion in such a manner that the first case portion is slidable in a direction perpendicular to a length direction of the full keyboard;
wherein the first and second case portions have a hiding mechanism with which a part of the slide connection member is prevented from being exposed to the outside when the first case portion is maximally slid out with respect to the second case portion;
a third case portion superposed on the second case portion;
a rotatable connection member disposed on a long side of a main planar portion of the second case portion, the rotatable connection member rotatably supporting the third case portion with the long side serving as an axis of rotation; a fourth case portion superposed on the third case portion;
a second slide connection member connecting the fourth case portion to the third case portion in such a manner that the fourth case portion is slidable in a length direction of the third case portion,
wherein a numeric keyboard is disposed on the third case portion;
a fifth case portion superposed on the fourth case portion; and
a second rotatable connection member disposed on a short side of a main planar portion of the fourth case portion, the second rotatable connection member supporting the fifth case portion in such a manner that the fifth case portion is rotatable with the short side serving as an axis of rotation,
a screen display unit is directly disposed on a surface of the fifth case portion.

2. The portable apparatus according to claim 1, wherein the slide connection member includes a slide rail member and a slide movement member slidably connected to the slide rail member,
wherein the second case portion includes a main planar portion and a plate-like extension portion extending from a long side of the main planar portion substantially in parallel with the main planar portion,
wherein the slide rail member is fixed to aback surface of the main planar portion of the second case portion,
wherein the first case portion has an open side portion on a long side thereof adjacent to a long side of the second case portion, the open side portion being connected to a space in the first case portion, and
wherein the plate-like extension portion of the second case portion moves into the space in the first case portion when the first case portion is slid so as to be superposed on the second case portion, and the extension portion has a length that allows an end of the extension portion to remain in the space when the first case portion is maximally pulled out of the second case portion.

3. The portable apparatus according to claim 1, wherein the second case portion has a lens unit of a camera on a rear surface thereof that faces the first case portion when the first case portion is closed and the first case portion serves as a lens cover of the camera, the lens cover capable of being opened and closed in a sliding manner.

4. The portable apparatus according to claim 1, further comprising an operation unit including a cross key, the operation unit being disposed on the fifth case portion and adjacent to the display screen unit.

5. A portable apparatus comprising:
a first case portion including a full keyboard;
a second case portion superposed on the first case portion;
a slide connection member superposing the second case portion on the first case portion and connecting the first case portion to the second case portion in such a manner that the first case portion is slidable in a direction perpendicular to a length direction of the full keyboard; and
wherein the second case portion has a lens unit of a camera on a rear surface thereof that faces the first case portion when the first case portion is closed, and the first case portion serves as a lens cover of the camera, the lens cover capable of being opened/closed in a sliding manner;
a third case portion superposed on the second case portion; and
a rotatable connection member disposed on a long side of a main planar portion of the second case portion, the rotatable connection member rotatably supporting the third case portion with the long side serving as an axis of rotation, a fourth case portion superposed on the third case portion; and a second slide connection member connecting the fourth case portion to the third case portion in such a manner that the fourth case portion is slidable in a length direction of the third case portion, wherein a numeric keyboard is disposed on the third case portion;

a fifth case portion superposed on the fourth case portion; and a second rotatable connection member disposed on a short side of a main planar portion of the fourth case portion, the second rotatable connection member supporting the fifth case portion in such a manner that the fifth case portion is rotatable with the short side serving as an axis of rotation, a screen display unit is directly disposed on a surface of the fifth case portion.

6. The portable apparatus according to claim 5, further comprising:

detection means for detecting a slide open and a slide close movement of the first case portion with respect to the second case portion;

orientation detection means for detecting at least an orientation of the first case portion; and control means for determining whether to switch on the camera from detection results obtained by the detection means and the orientation detection means.

7. A portable apparatus comprising:

five case portions superposed on each other in at least one state;

at least one slide connection member connecting at least two case portions in such a manner that the at least two case portions are slidable with respect to each other; and at least one rotatable connection member connecting at least a second two case portions in such a manner that the at least second two case portions are rotatable with a short side serving as an axis of rotation, at least a second rotatable connection member connecting at least a different second two case portions in such a manner that the at least second two case portions are rotatable with a long side serving as an axis of rotation, wherein each of the slide connection member and the rotatable connection member performs an open operation and a close operation of corresponding one of the case portions, and the portable apparatus can take at least six different configurations in accordance with combinations of the open operation and the close operations;

wherein the five case portions that are superposed on each other in at least one state comprise:

a first case portion;

a second case portion, wherein the first and second case portion are operatively connected by a slide connection member;

a third case portion, wherein the third case portion is operatively connected to the second case portion a rotational connection member;

a fourth case portion, wherein the fourth case portion is operatively connected to the third case portion by a second slide connection member; and a fifth case portion, wherein the fifth connection member is operatively connected to the fourth case portion by a second rotational connection member, and wherein a numeric keyboard is disposed on the third case portion, wherein the screen display unit is disposed on the fifth case portion.

* * * * *